(12) United States Patent
Hohmann et al.

(10) Patent No.: US 12,202,106 B1
(45) Date of Patent: Jan. 21, 2025

(54) LIFTING AND TRANSPORTING DEVICE

(71) Applicants: Frank Hohmann, Warstein (DE); Jörg Hohmann, Meschede (DE)

(72) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 0 days.

(21) Appl. No.: 18/755,848

(22) Filed: Jun. 27, 2024

(30) Foreign Application Priority Data

Jul. 20, 2023 (DE) ..................... 10 2023 119 208.6

(51) Int. Cl.
| | |
|---|---|
| B66C 9/04 | (2006.01) |
| B25B 29/00 | (2006.01) |
| B25B 29/02 | (2006.01) |
| B66C 23/18 | (2006.01) |
| B66F 19/00 | (2006.01) |
| B23P 19/06 | (2006.01) |

(52) U.S. Cl.
CPC .............. *B25B 29/02* (2013.01); *B25B 29/00* (2013.01); *B66C 9/04* (2013.01); *B66C 23/18* (2013.01); *B66F 19/00* (2013.01); *B23P 19/067* (2013.01)

(58) Field of Classification Search
CPC .......... B25B 29/02; B25B 29/00; B66C 9/04; B66C 23/18; B66F 19/00; B66F 3/36; B23P 19/04; B23P 19/067
USPC ...................................................... 294/67.1
See application file for complete search history.

(56) References Cited

U.S. PATENT DOCUMENTS

| | | |
|---|---|---|
| 707,660 A | 8/1902 | Watlington |
| 3,255,893 A | 6/1966 | Hainer et al. |
| 4,213,727 A | 7/1980 | Lighthipe, Jr. |
| 4,275,620 A * | 6/1981 | Collins ................. B25B 21/002 81/57.39 |
| 4,297,923 A | 11/1981 | Specht et al. |

(Continued)

FOREIGN PATENT DOCUMENTS

| | | |
|---|---|---|
| DE | 102012009255 A1 | 6/2017 |
| DE | 102022105559 B3 | 3/2023 |

(Continued)

OTHER PUBLICATIONS

JPTO Office Action dated Oct. 22, 2024, in application No. 2024-113867; with attached English Machine translation of the Office Action, dated Oct. 16, 2024 (13 pages).

*Primary Examiner* — Paul T Chin
(74) *Attorney, Agent, or Firm* — McAndrews, Held & Malloy, Ltd.; Michael Stanley Tomsa (57) ABSTRACT

A lifting and transporting device for lifting a load and transporting the same transversely to the lifting direction. The lifting and transporting device being for use in manufacturing a screwed flange connection. The lifting and transporting device having a frame for picking up and lifting a load, a holder for holding the load and comprising a hoist for lifting and lowering the holder with the load attached thereto, includes a tensile anchor which is operatively connected with the bolting tool and in a state of the lifting and transporting device mounted on a flange can releasably be connected with the flange or with at least one screw bolt connection and is designed to limit the lift-off path of the bolting tool in the hoisting direction to a specified amount in the case of a fracture of the screw bolt connection to be pretensioned or of the connection of the bolting tool with the screw bolt connection to be pretensioned during the pretensioning of this screw bolt connection.

11 Claims, 8 Drawing Sheets

(56) References Cited

U.S. PATENT DOCUMENTS

| | | | |
|---|---|---|---|
| 4,883,185 A | | 11/1989 | Fujitani et al. |
| 5,110,090 A | * | 5/1992 | McDuffie .................. B66F 3/36 |
| | | | 254/134 |
| 5,379,814 A | | 1/1995 | Posly |
| 5,406,996 A | | 4/1995 | Wagner et al. |
| 5,425,614 A | | 6/1995 | Perussi et al. |
| 5,582,503 A | | 12/1996 | Sandoval |
| 9,364,946 B2 | | 6/2016 | Hohmann et al. |
| 9,945,114 B2 | * | 4/2018 | Jaccard ............... E04B 1/34807 |
| 10,071,860 B2 | * | 9/2018 | Kahrger ................. B65G 15/00 |
| 11,124,399 B2 | | 9/2021 | Hohmann et al. |
| 11,731,223 B1 | | 8/2023 | Hohmann et al. |
| 2009/0304487 A1 | | 12/2009 | Gonzalo |
| 2014/0350724 A1 | * | 11/2014 | Johst ....................... F03D 13/20 |
| | | | 700/253 |
| 2019/0299346 A1 | | 10/2019 | Hohmann et al. |

FOREIGN PATENT DOCUMENTS

| | | |
|---|---|---|
| DE | 102019200042 B3 | 5/2024 |
| EP | 2660182 A2 | 11/2013 |
| EP | 3663034 A1 | 6/2020 |
| EP | 3677537 A1 | 7/2020 |
| JP | H08122479 A | 5/1996 |
| JP | H09 295230 A | 11/1997 |
| JP | 2012057690 A | 3/2012 |
| JP | 2019-171565 A | 10/2019 |
| KR | 1020130026039 A | 3/2013 |
| WO | 2016193297 A1 | 12/2016 |

* cited by examiner

LIFTING AND TRANSPORTING DEVICE

RELATED APPLICATION

The present application claims priority to German Patent Application No. DE 10 2023 119 208.6, filed Jul. 20, 2023, and entitled "Lifting and Transporting Device" which is hereby incorporated by reference in its entirety.

BACKGROUND

A generic lifting and transporting device is known from DE 10 2012 009 255 A1. Such a device can be used to pretension screw bolt connections in flange connections, in which the screw bolt is inserted from below through the through holes aligned with each other in the components to be connected with each other until the bolt head rests against the flange underside of the components to be connected, and a nut is screwed onto the threaded bolt end on the flange upper side by hand until it rests against the flange upper side. A bolting tool is held in the lifting and transporting device above the flange upper side and is positioned above the screw bolt connection to be pretensioned and is then lowered onto the same. After pretensioning the screw bolt connection, the bolting tool is lifted again by means of the lifting and transporting device and shifted to the next screw bolt connection.

From DE 10 2019 200 042 B3 a lifting and transporting device is known, by means of which screw bolt connections in flange connections can be pretensioned, in which the screw bolt is inserted from above into the through holes of the flanges to be connected with each other and the nuts are screwed onto the screw bolts by hand on the flange underside.

DE 10 2022 105 559 B3 discloses a lifting and transporting device by means of which bolting tools can also be brought in engagement with a screw bolt connection on inclined flanges on the flange upper side and/or on the flange underside.

From KR 10 2013 0 026 039 A there is known a maintenance robot for tightening, inspecting and marking screws in flange connections of wind turbines. The maintenance robot is arranged in front of the flange front side and includes an upper and a lower arm for holding and fastening a screw. Furthermore, it includes supporting portions which are meant to engage over and under the flange and stabilize the movement of the maintenance robot when it is moved along the flange.

It is the object of the present disclosure to increase safety when handling a lifting and transporting device.

SUMMARY

The present disclosure relates generally to a lifting and transporting device, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y, and z."

In accordance with this application, pretensioning a screw bolt connection is understood to be both a pretensioning free from friction and torsion, in which exclusively a tensile force is applied to the screw bolt and the screw nut subsequently is turned, and a rotary pretensioning—e.g. by the torque method or the rotation angle method.

Correspondingly, in accordance with this application bolting tools are understood to be both tension-applying bolting tools, e.g. bolt tensioning cylinders, and rotary bolting tools, e.g. torque wrenches or nut runners, wherein the bolting tools can be automatic or also manual bolting tools.

Furthermore, a bolting position correspondingly is understood to be an attitude or position of a bolting tool in which the same can pretension a screw bolt connection.

In accordance with this application, load space is understood to be the space occupied by the load to be lifted or to be transported, i.e. the space occupied by the bolting tool.

Due to the disclosed measures, a lifting and transporting device and the bolting tool fixed in the same cannot be catapulted away from the assembly site and thereby possibly injure persons, in particular the assembly personnel operating the lifting and transporting device and the bolting tool, if the screw bolt connection to be pretensioned or the connection of the bolting tool with the screw bolt connection to be pretensioned breaks during the pretensioning operation. Such fractures occur in the case of material defects and can therefore not be excluded. As during the pretensioning operation the applied pretensioning force acts both in the lifting and transporting device and in the bolting tool and in the screw bolt connection, this pretensioning force suddenly is released in the above-described fractures and thus causes a sudden acceleration of the bolting tool and the lifting and transporting device connected with the same. Due to the fact that the bolting tool is operatively connected with a tensile anchor, which in a state of the lifting and transporting device mounted on a flange can releasably be connected with the flange or with at least one screw bolt connection, on the one hand both the bolting tool and at the same time the lifting and transporting device connected with the same is secured against uncontrolled lifting off from the flange and on the other hand quickly pushing on the lifting and transporting device to the next screw bolt connection to be pretensioned is possible after pretensioning the screw bolt connection.

The term "operatively" here means that the tensile anchor need not directly be attached to the bolting tool, but can also indirectly—for example by means of the frame—be connected with the bolting tool.

The disclosure makes use of the fact that during pretensioning the lifting and transporting device and the bolting tool are firmly connected with each other, and therefore only one of the two must be connected with the tensile anchor in order to secure both of them against uncontrolled lifting off.

Furthermore, as according to the disclosure the tensile anchor is designed to limit the lift-off path of the bolting tool in the hoisting direction to a specified amount in the case of a fracture as mentioned above, it is ensured that in normal operation the bolting tool has sufficient possibility for movement during the tensioning operation in the tensioning or hoisting direction up to the specified amount, i.e. that for example the hoisting path maximally possible in the lifting and transporting device or a hoisting path required for the respective tensioning operation can be traversed by the bolting tool unimpededly.

In a preferred example of the disclosure, the tensile anchor includes an L-shaped web which is designed to extend along the flange front side with a first portion and along the flange underside with a second portion extending transversely to the first portion, wherein at least on a partial section the second portion does not exceed a specified clear maximum distance to the flange underside, wherein the L-shaped web is of flexurally rigid design and is flexurally rigidly connected with the frame and designed to limit the lift-off path of the frame in the hoisting direction to a second specified amount by form fit between the flange underside and at least said partial section of the second portion of the L-shaped web. With these measures, the tensile anchor is of an extremely assembly-friendly type, as with the normal pushing of the lifting and transporting device onto the flange for pretensioning purposes and with the normal pushing on of the lifting and transporting device to the next screw bolt connection after pretensioning, the tensile anchor also is already mounted ready for operation. The tensile anchor here is attached to the frame so that the bolting tool can freely move in the frame on its lifting path and nevertheless is firmly connected with the frame by means of its attachment to the shiftable holder and thereby is secured against uncontrolled lifting off.

Advantageously, the L-shaped web includes two L-shaped web parts which are spaced apart from each other in the transport direction and extend parallel to each other. In this way, the tipping stability about an axis extending perpendicularly to the transport direction and parallel to the flange is ensured so that in the case of a fracture in question here the vertical alignment of the lifting and transporting device including the bolting tool substantially is maintained and therefore major damages of the lifting and transporting device and of the bolting tool, which can occur when tipping over, are not to be expected.

In a favorable development of the disclosure, the second portion of the L-shaped web is designed to end in front of the screw bolt connections. The manufacturing expenditure for the tensile anchor thereby can be kept relatively low.

In another advantageous example of the disclosure, the second portions of the two L-shaped web parts each on at least one partial section are designed to engage behind the screw bolt connections, which are adjacent to the screw bolt connection to be pretensioned, and the partial sections engaging behind are said partial sections which do not exceed the specified clear maximum distance to the flange underside. With these measures, the lifting and transporting device additionally is secured against slipping off over the flange front side perpendicularly to the transport direction and at the same time also against tipping about an axis parallel to the transport direction, as the partial sections engaging behind the screw bolt connections either rest against the screw bolt connections engaged behind or against the component wall extending downwards from the flange, depending on the tipping direction.

Preferably, the L-shaped web furthermore is designed to form a C-shaped flexurally rigid structure in cooperation with the first support bearing resting on the flange upper side, which C-shaped structure in the case of a fracture of the screw bolt connection to be pretensioned or of the connection of the bolting tool with the screw bolt connection to be pretensioned limits the tipping angle of the frame about an axis parallel to the transport direction to a respectively specified amount by form fit with the flange. The tipping stability thereby is increased even further and the absorbable tipping moment also is increased.

In another favorable example of the disclosure, the tensile anchor includes at least one tensile element which is attached to the frame and includes a screw connector which can be screwed onto the threaded end of a screw bolt connection protruding from a screw nut on the flange upper side. Such a tensile anchor can likewise be manufactured at low cost and be mounted relatively quickly.

Preferably, the frame includes a transverse strut which in a state of the lifting and transporting device mounted on a flange extends above the screw bolt connection to be pretensioned, wherein the tensile element extends transversely across the transverse strut from its side facing the flange front side to its side facing away from the flange front side and on both sides of the frame can be screwed onto a threaded end of a screw bolt connection protruding from a screw nut. With these measures, the manufacturing and assembly costs of a tensile anchor are distinctly reduced even more.

In another advantageous example of the disclosure, the tensile anchor is formed of two separate tensile elements which each are attached to one of the frame parts and include a screw connector which can be screwed onto the threaded end of a screw bolt connection protruding from a screw nut on the flange upper side. Such a tensile anchor on the one hand is simpler to manufacture and easier to mount and on the other hand also is operationally more reliable, as in the case of the tearing of the one tensile element the other tensile element still can perform its functions.

Preferably, each screw connector is provided with a quick release or clamping mechanism, by means of which the connection with the threaded end protruding from a screw nut can quickly be produced and be released again. The assembly times thereby can be further reduced.

Preferably, at least the second support bearing is magnetic. In this way, the lifting and transporting device can even better be brought into abutment with the component wall and tipping can be prevented in the case of a fracture of the screw bolt connection to be pretensioned or of the connection of the bolting tool with the screw bolt connection to be pretensioned.

The Figures show examples of a lifting and transporting device according to the disclosure for use together with a bolt tensioning cylinder. By simple constructive changes, however, a lifting and transporting device according to the disclosure can be used for any other automatic or manual bolting tool.

The examples of a lifting and transporting device 1 according to the disclosure as shown in the Figures include a frame 2, a holding means 3 (e.g., a holder), a hoisting means 4 (e.g., a hoist), first, second and third support bearings 5, 6, 7 as well as an auxiliary support bearing 8. The lifting direction is designated with 9 and the transport direction with 10.

Figure 1:
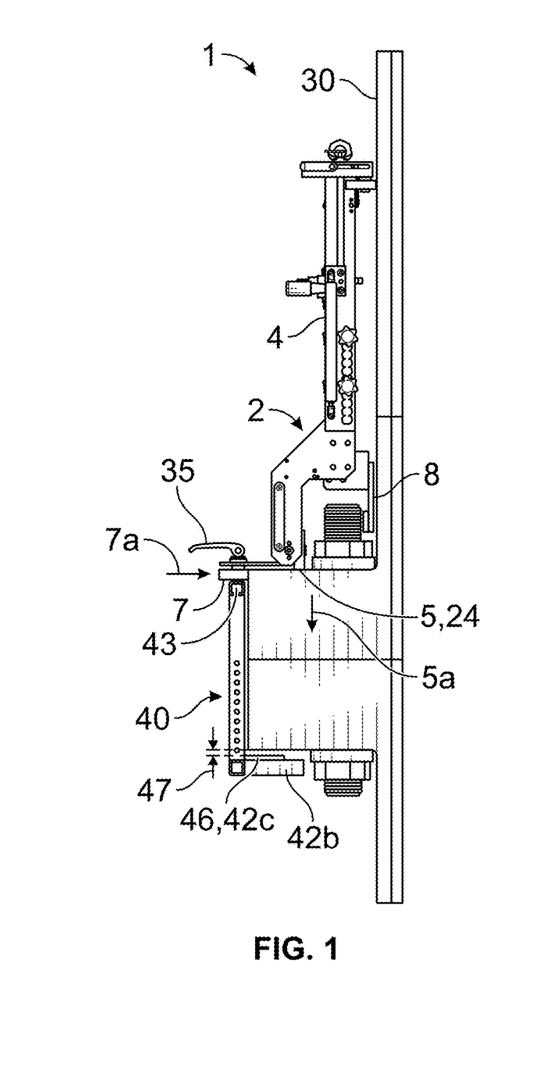
FIGS. 1 to 4 show a vertical side view, a front view, a top view and a perspective view of a first example of a lifting and transporting device according to the disclosure, used when producing a screwed flange connection, yet without any bolting tool.
Figure 2:
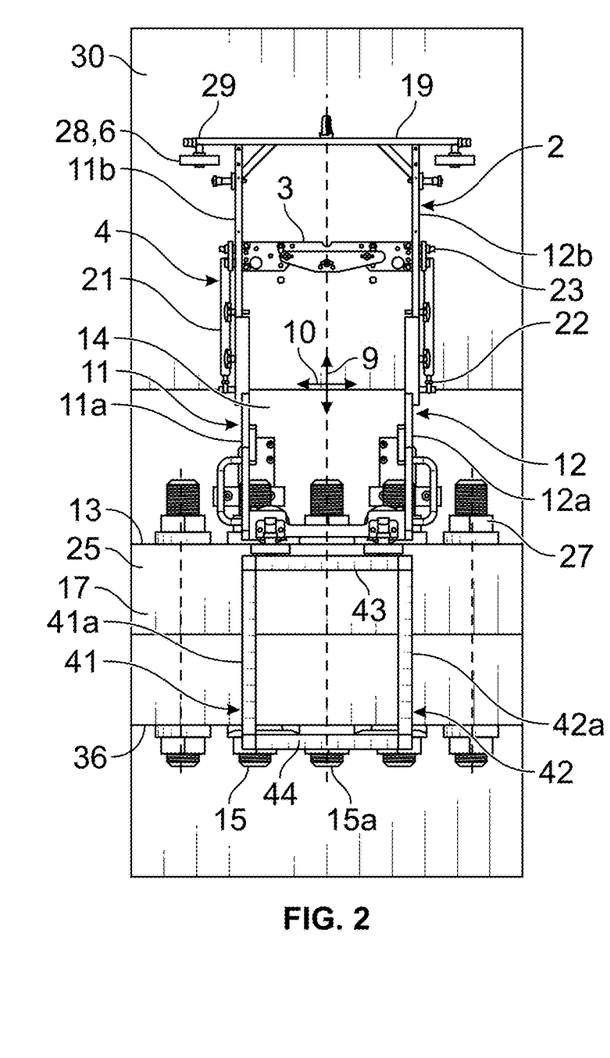
Figure 3:
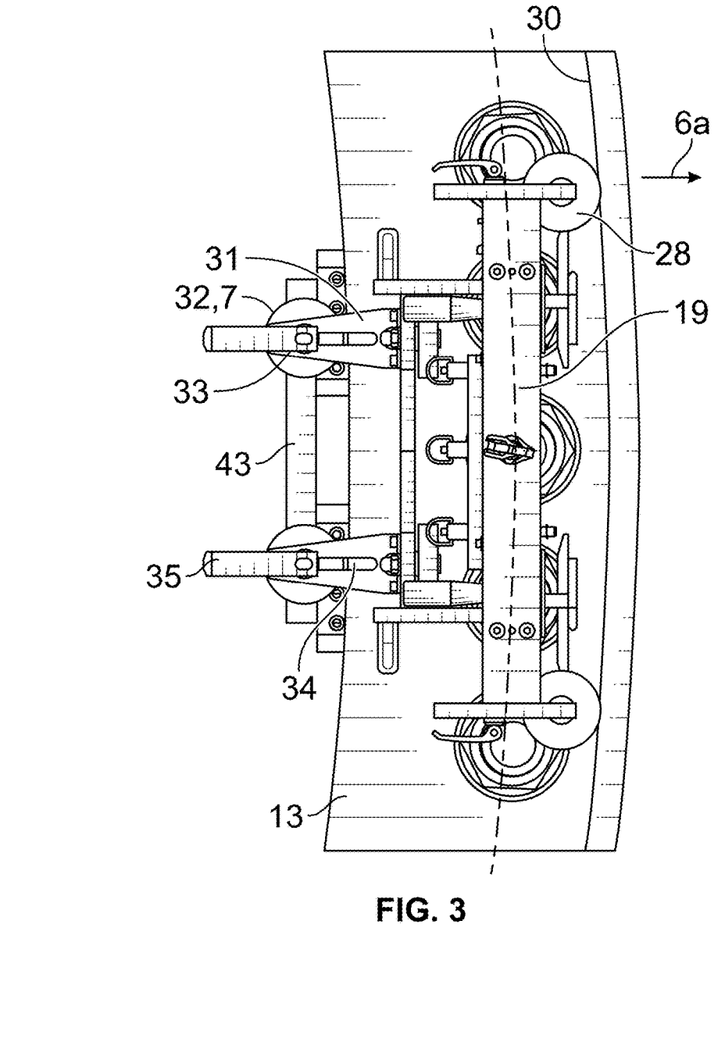
Figure 4:
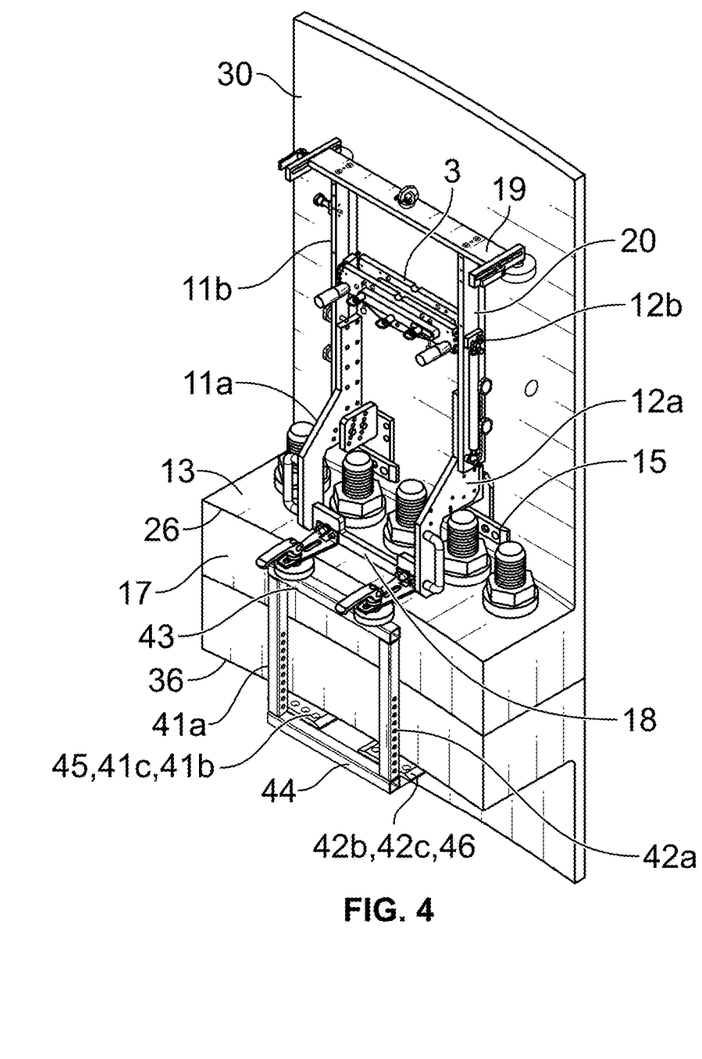
Figure 5:
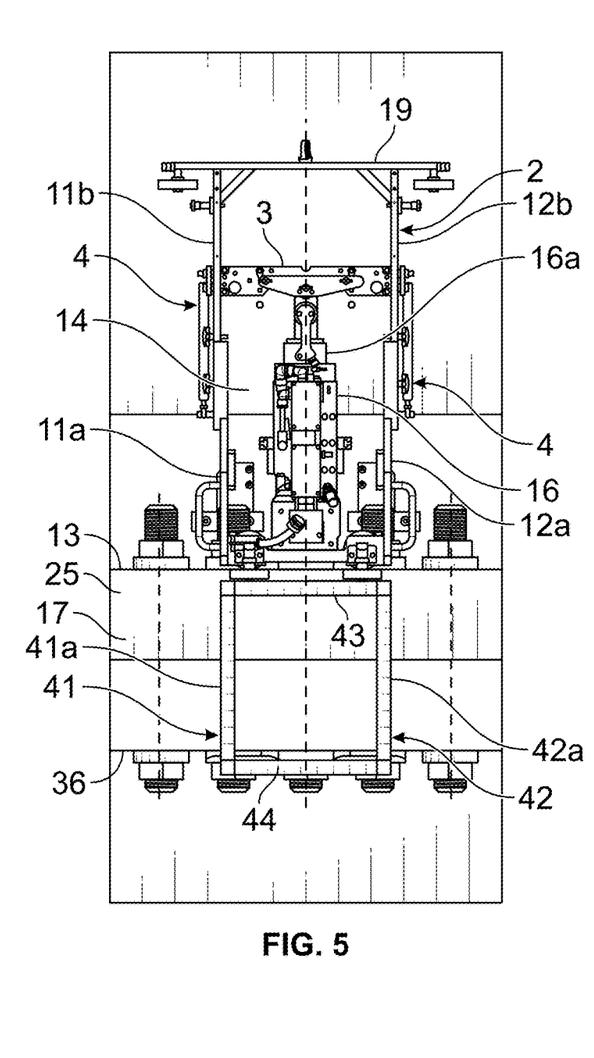
FIG. 5 shows the front view of FIG. 2, with bolting tool.
Figure 6:
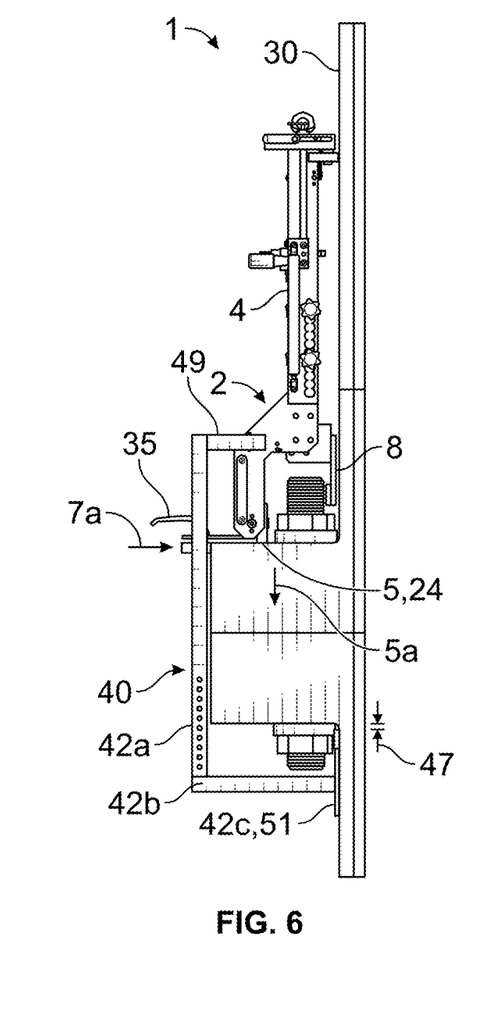
FIGS. 6 to 10 show a vertical side view, a front view, a top view, a bottom view and a perspective view of a second example of a lifting and transporting device according to the disclosure, used when producing a screwed flange connection, yet without any bolting tool.
Figure 7:
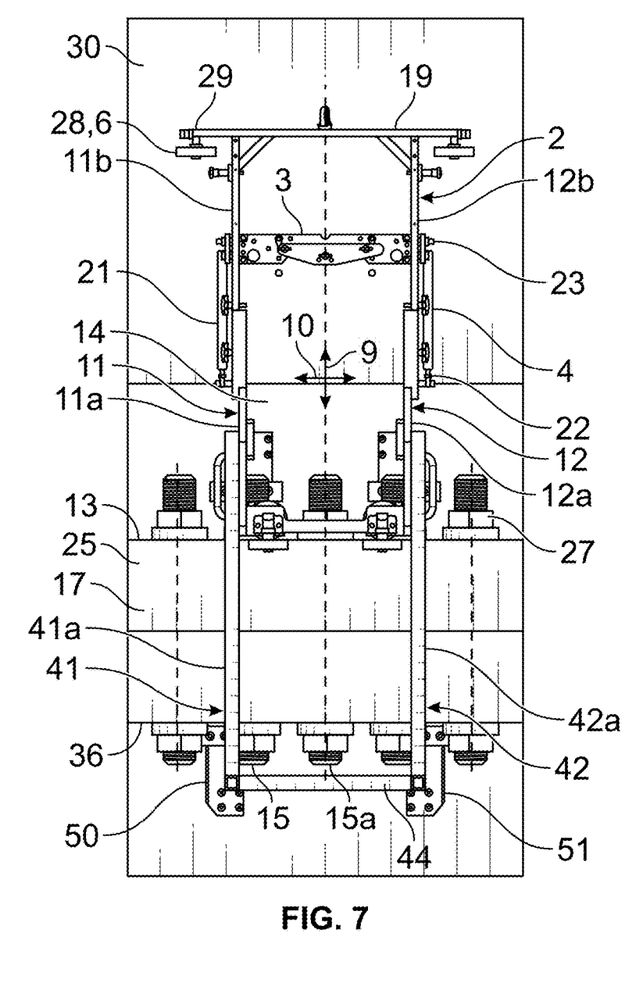
Figure 8:
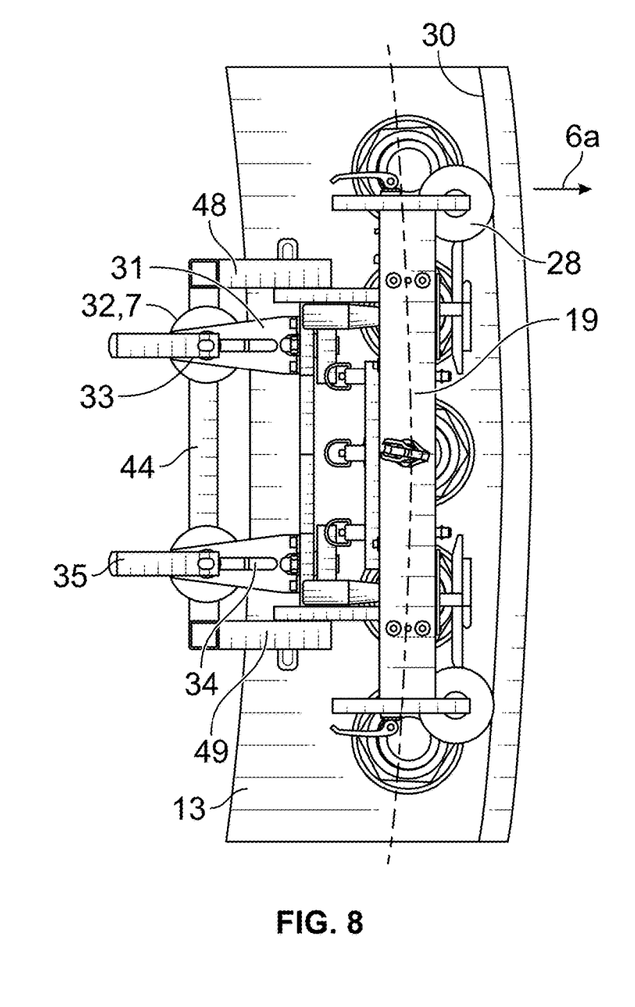
Figure 9:
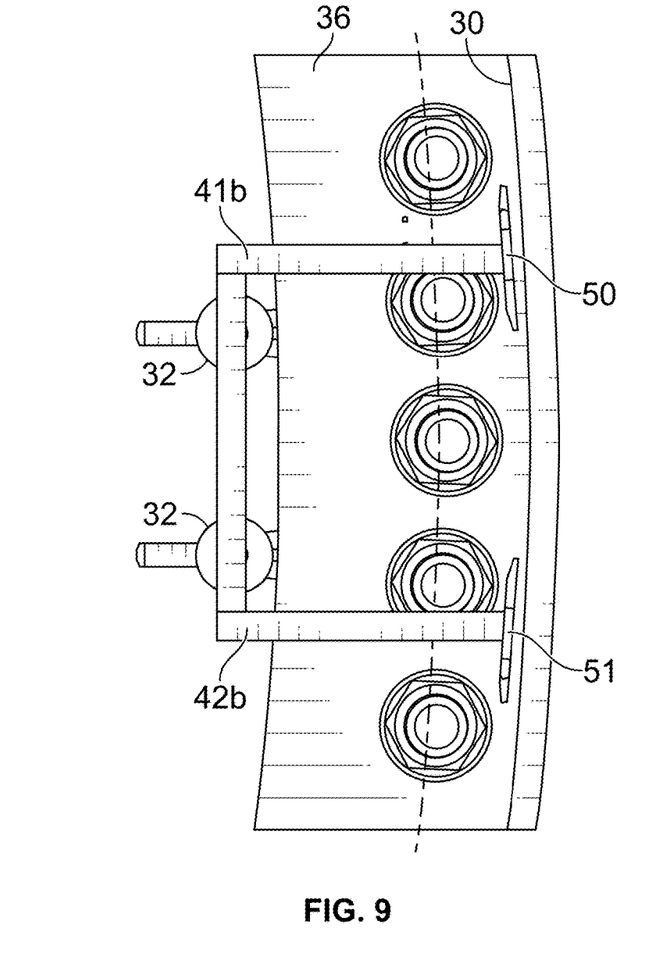
Figure 10:
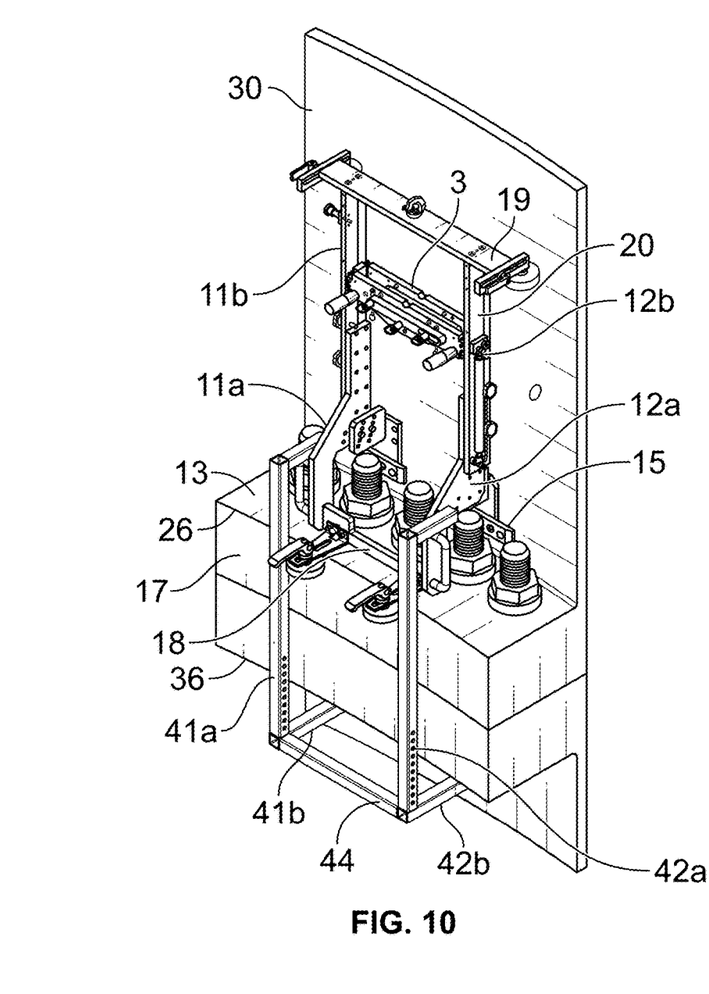
Figure 11:
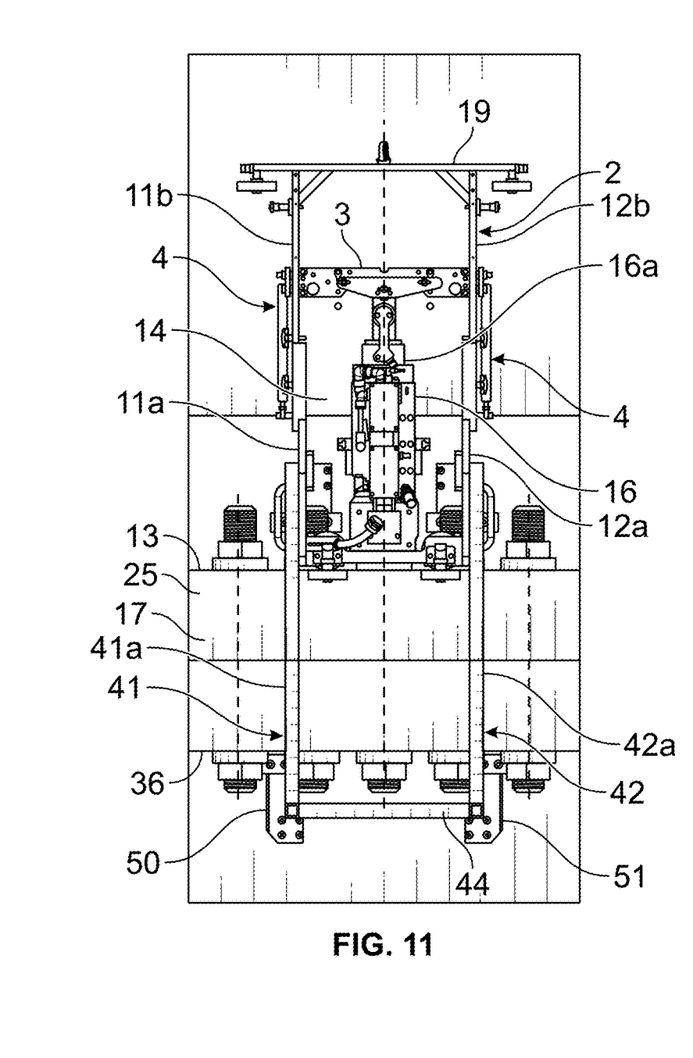
FIG. 11 shows the front view of FIG. 7, with bolting tool.
Figure 12:
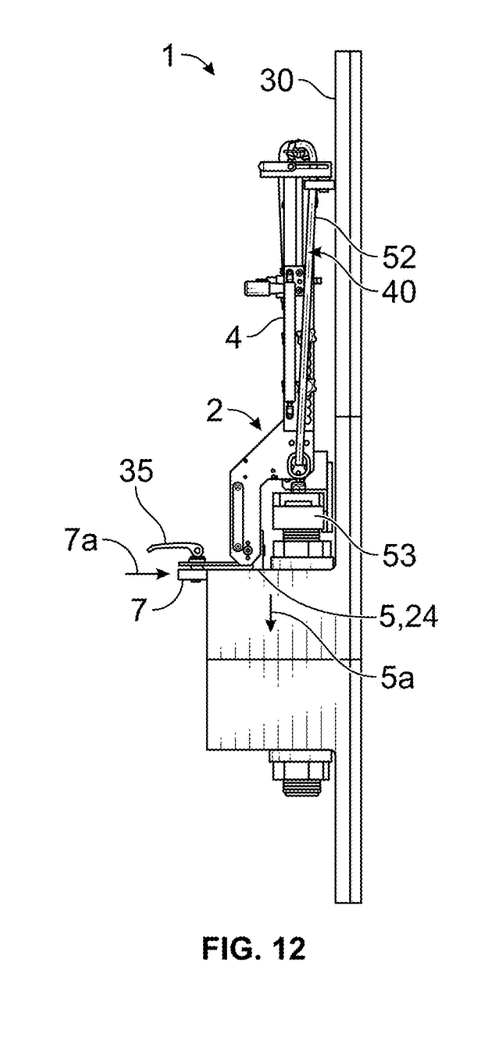
FIGS. 12 to 15 show a vertical side view, a front view, a top view and a perspective view of a third example of a lifting and transporting device according to the disclosure, used when producing a screwed flange connection, yet without any bolting tool.
Figure 13:
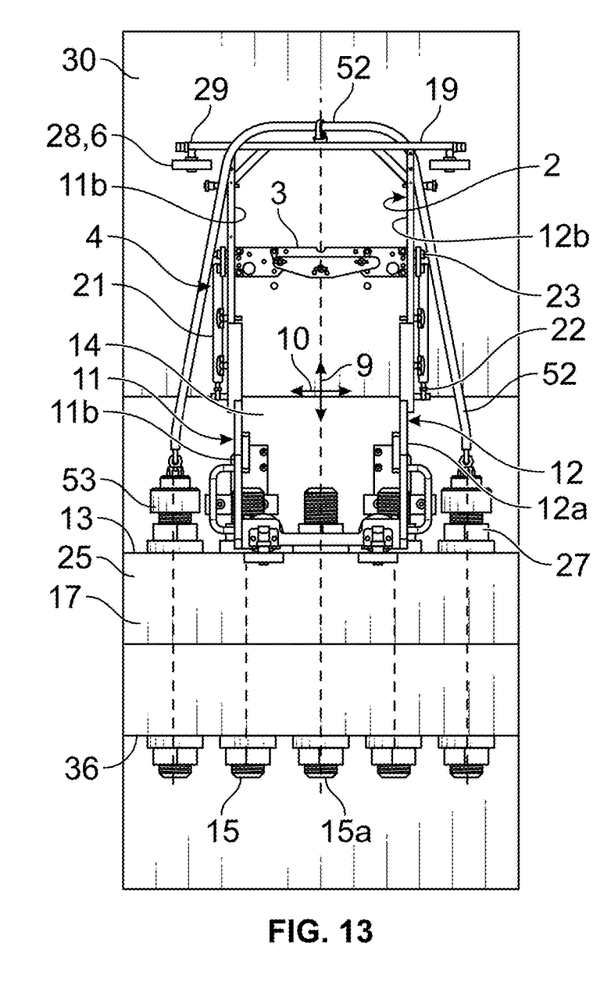
Figure 14:
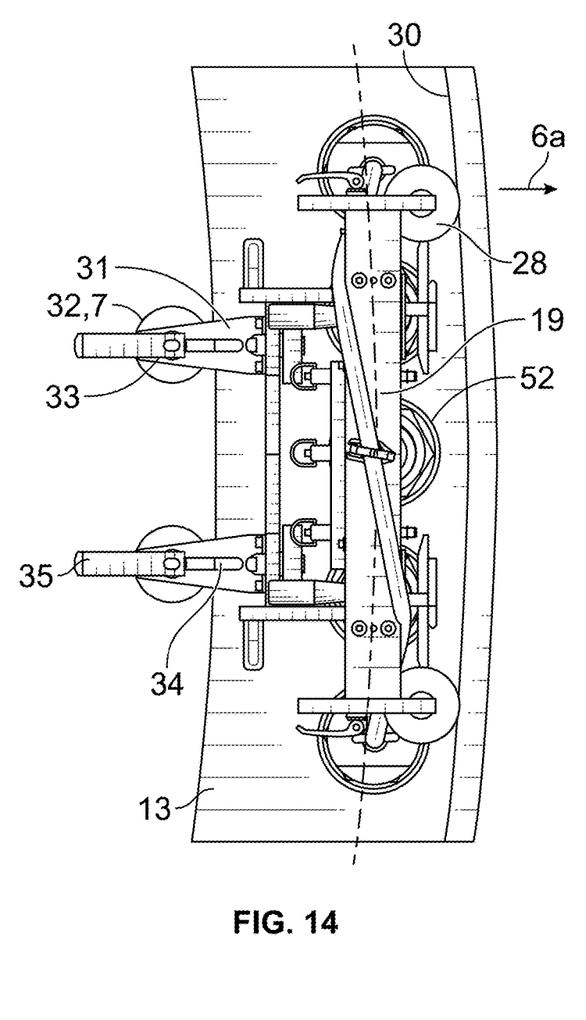
Figure 15:
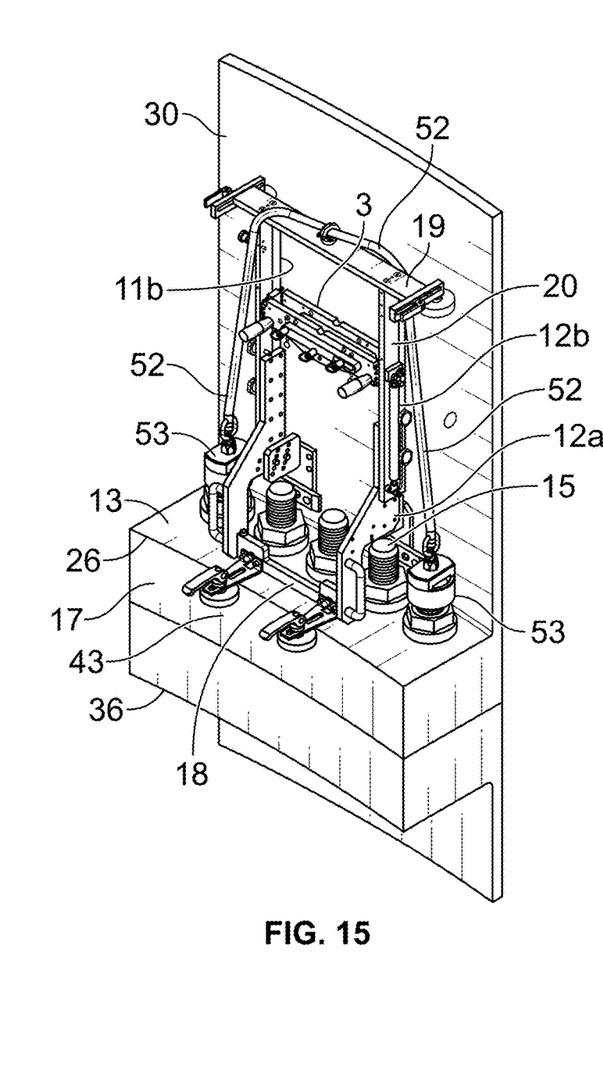
Figure 16:
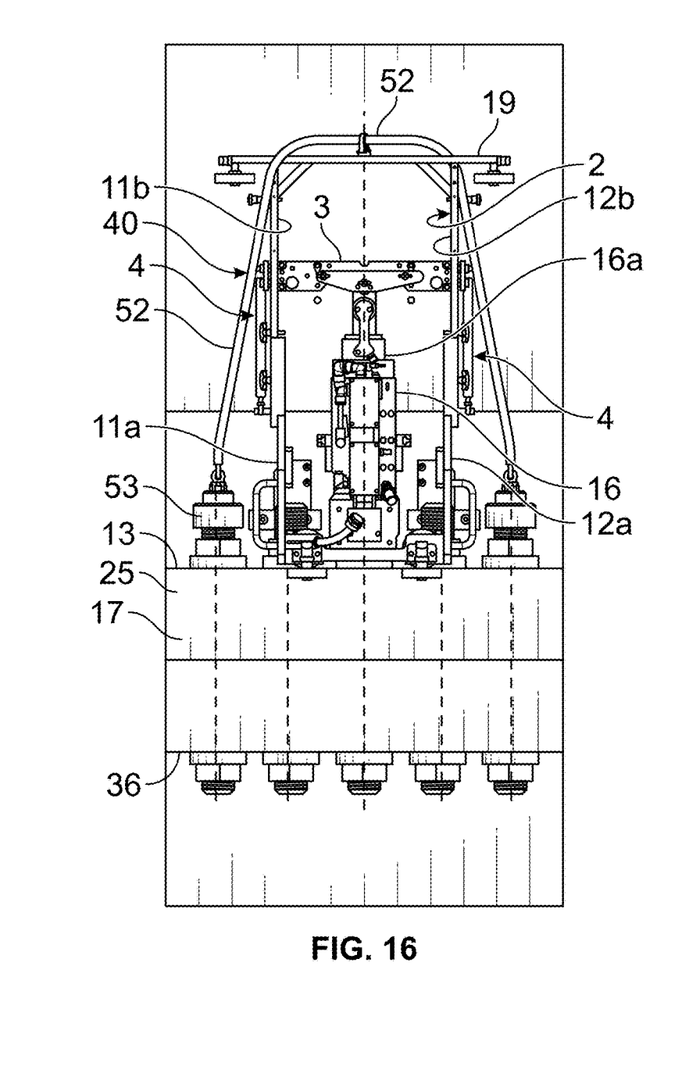
FIG. 16 shows the front view of FIG. 13, with bolting tool.

The frame 2 is formed of two frame parts 11, 12 which are arranged on the flange upper side 13 in the transport direction 10 before and behind a load space 14 and extend beside and above the load space 14 perpendicularly to the transport direction 10. In the illustrated exemplary examples, the clear distance between the two frame parts 11, 12 is designed for accommodating a screw bolt connection 15 and a bolt tensioning cylinder 16 set onto the same (FIGS. 5, 11 and 16).

The frame parts 11, 12 are each formed of first and second frame portions 11a, 11b; 12a, 12b. The first frame portions 11a, 12a each are of L-shaped design. Their first ends each are arranged in a region between the flange front side 17 and the screw bolt connections 15. From there, the first frame portions 11a, 12a initially extend upwards and then over the screw bolt connections 15 adjacent to the screw bolt connection 15a to be pretensioned. There, their second ends each are flexurally rigidly connected, for example screwed, to a first end of the second frame portions 11b, 12b. The second frame portions 11b, 12b extend in a vertical direction beyond the upper side 16a of the bolt tensioning cylinder 16 to be accommodated.

The free, first ends of the first frame portions 11a, 12a are connected with each other by a lower transverse strut 18, and the free, second ends of the second frame portions 11b, 12b are connected with each other by an upper transverse strut 19.

In the second frame portions 11b, 12b there is each formed a slot 20 extending in their longitudinal direction, in which the holding means 3 is shiftably mounted. The holding means 3 is configured as a strut extending in the transport direction, which at its ends is vertically shiftably mounted in the slots 20. In the middle of its longitudinal extension, the holding means 3 includes an attachment for the bolt tensioning cylinder 16, in order to lower the bolt tensioning cylinder 16 before pretensioning the screw bolt connection 15a and to lift it from the same after pretensioning.

At the second frame portions 11b, 12b the hoisting means 4 is attached. In the illustrated exemplary example, it includes a gas pressure spring 21 at each of the second frame portions 11b, 12b, whose first end 22 each is non-shiftably attached close to the first end of the second frame portions 11b, 12b, and whose second end 23 each is connected with an end of the holding means 3 on the side of the second frame portions 11b, 12b facing away from the load space 14. By means of the gas pressure springs 21 the bolting tool 16, i.e. in the illustrated case the bolt tensioning cylinder, is pushed upwards against gravity after pretensioning/releasing the screw bolt connection 15a. The bolting tool 16 is non-shiftably connected with the holding means 3. For example, it can be screwed to the holding means 3 or be magnetically or positively held by the same (e.g. by means of a locking bolt).

At the two ends of the lower transverse strut 18, a first support roller 24 each is rotatably attached, whose axis of rotation extends horizontally and perpendicularly to the transport direction 10. Both first support rollers 24 jointly form a first support roller pair. It is designed for abutment against the upper side 13 of a flange 25 and forms the first support bearing 5.

The term "flange 25" here refers to a flange connection or pairing comprising an upper flange and a lower flange. The flange 25 can be of linear or ring-shaped design in the form of an inner or outer ring.

The support direction 5a of the first support bearing 5 extends perpendicularly to the transport direction 10 in the lifting direction 9. These support rollers 24 rest against the upper side 13 of the flange 25 between the screw bolt connections 15 and the flange edge 26, so that when rolling on to the adjacent screw bolt connection 15 they can roll off between the screw nuts 27 and the flange edge 26.

Close to the second, free ends of the two second frame portions 11b, 12b a second support roller 28 each is rotatably mounted on the upper transverse strut 19 about an axis of rotation 29, which extends vertically and perpendicularly to the transport direction 10. Together, they form a second support roller pair. It is designed for horizontal abutment against a component wall 30 extending perpendicularly from the flange 25 and forms the second support bearing 6. Its support direction 6a extends perpendicularly to the transport direction 10 and perpendicularly to the lifting direction 9, i.e. perpendicularly to the support direction 5a. The support rollers 28 rest against the component wall 30 above the end of the screw bolt connection 15a and thus can unimpededly roll off on the component wall 30 in the transport direction 10. Transversely to the transport direction 10, the second support rollers 28 can each be horizontally shiftable by a specified amount, in order to ensure a safe abutment against the component wall 30. By means of an arresting device, they can be arrested in their desired horizontal position. Moreover, the second support rollers 28 can be of the magnetic type so that the lifting and transporting device 1 can even better be brought into abutment with the component wall 30 and tipping on fracture of the screw bolt connection 15a to be pretensioned or of the connection of the bolting tool 16 with the screw bolt connection 15a can be prevented.

The first and the second support roller pair, i.e. the first and the second support bearing 5, 6 have a distance to each other in the lifting direction 9 which substantially corresponds to the length of the frame parts 11, 12. Their distance perpendicularly to the transport direction 10 and to the lifting direction 9 substantially corresponds to the horizontal extension of the first frame portions 11a, 12a.

Furthermore, close to the first, free ends of the two first frame portions 11a, 12a a third support roller 32 each is rotatably attached to tabs 31, which are flexurally rigidly attached to the lower transverse strut 18, whose axis of rotation 33 extends vertically and perpendicularly to the transport direction 10. This third support roller pair is designed for horizontal abutment against the flange front side 17 and forms the third support bearing 7. Its support direction 7a extends parallel to the support direction 6a of the second support bearing 6. In the tabs 31, these support rollers 32 are horizontally shiftable transversely to the transport direction 10 in one oblong hole 34 each, in order to ensure an abutment against the flange front side 17. By means of a further arresting device 35, they can be arrested in their desired horizontal position.

At the first frame portions 11a, 12a an auxiliary support bearing 8 each is attached, which is designed for engaging behind the screw bolt connections 15 which are adjacent to the screw bolt connection 15a to be pretensioned. Both in their horizontal and in their vertical position, the auxiliary support bearings 8 each are adjustable by means of an adjusting device, in order to ensure their safe abutment against the adjacent screw bolt connections 15. In their desired horizontal and vertical positions, they can be arrested by means of further (non-illustrated) arresting devices.

The exemplary example of a lifting and transporting device 1 as shown in FIGS. 1 to 5 includes a tensile anchor 40 which is configured as an L-shaped web that is flexurally rigidly attached to the tabs 31. The L-shaped web 40 is formed of two L-shaped web parts 41, 42 spaced apart from each other in the transport direction and parallel to each other, each comprising a first portion 41a, 42a which in the inserted state of the lifting and transporting device 1 extends along the flange front side 17, and each comprising a second portion 41b, 42b, which extends transversely to the first portion 41a, 42a and extends along the flange underside 36. The first portions 41a, 42a are connected with each other at their two ends by means of an upper and a lower strut 43, 44 to form a frame deformation-resistant in the transport direction, which is attached there to the tabs 31, where a third support roller 32 also is attached.

The second portions 41b, 42b are flexurally rigidly connected to this frame 41a, 42a, 43, 44 and extend parallel to the flange underside 36 up to a specified distance in front of the screw bolt connections 15. On their side facing the flange underside 36, the portions 41b, 42b on a partial section 41c, 42c each include a faceplate 45, 46 parallel to the flange underside 36 at a specified clear distance from the flange underside 36.

The second portions 41b, 42b and the lower strut 44 are height-adjustably attached to the first portions 41a, 42a in order to be able to easily adapt the tensile anchor 40 configured as an L-shaped web to flanges of different thicknesses.

In the case of a fracture of the screw bolt connection 15a to be pretensioned or of the connection of the bolting tool 16 with the screw bolt connection 15a to be pretensioned during the pretensioning operation, the bolting tool 16 moves up in the lifting and transporting device 1 in the lifting direction 9, until it strikes against the upper transverse strut 19 and thereby exerts an upwardly directed force on the lifting and transporting device 1, which causes lifting off of the lifting and transporting device 1 from the flange upper side 13. The faceplates 45, 46 of the second portions 41b, 42b of the L-shaped web parts 41, 42 rest against the flange underside 36 and due to this form fit cause a limitation of the lift-off path of the lifting and transporting device 1 and hence also of the bolting tool 16 attached in the lifting and transporting device 1.

The clear distance 47 between the second portions 41b, 42b and the flange underside 36 is designed such that including the lift-off path of the lifting and transporting device 1 the lift-off path of the bolting tool 16 altogether does not exceed a specified amount.

In addition, due to the form fit of the faceplates 45, 46 of the second portions 41b, 42b of the L-shaped web parts 41, 42 with the flange underside 36 in cooperation with the auxiliary support bearings 8, which on the flange upper side 13 engage behind the screw bolt connections 15 adjacent to the screw bolt connection 15a to be pretensioned, a tipping moment can also be absorbed, as a C-shaped flexurally rigid structure has been obtained from the second portions 41b, 42b up to the auxiliary support bearings 8 due to the succeeding flexurally rigid connections. In this way, tipping of the lifting and transporting device 1 over the flange edge 26 is prevented.

In the exemplary example as shown in FIGS. 6 to 11, the tensile anchor 40 substantially likewise is of L-shaped design, with the following modifications as compared to the exemplary example of FIGS. 1 to 5:

The first portions 41a, 42a extend beyond the flange upper side 13. At their first end, an end of a connecting web 48, 49 each is flexurally rigidly attached, whose other end is flexurally rigidly attached to the first frame portion 11a, 12a.

The first portions 41a, 42a extend past the third support rollers 32 and—in the inserted state of the lifting and transporting device—beyond the flange underside 36 to such an extent that the second portions 41b, 42b can extend beyond the screw bolt connections 15, which are adjacent to the screw bolt connection 15a to be pretensioned, in the direction of the component wall 30. At their free end a plate 50, 51 each is flexurally rigidly attached, which is configured to extend between said screw bolt connections 15 and the component wall 30 in the direction of the flange underside 36, i.e. to engage behind said screw bolt connections 15.

In this exemplary example, the clear distance 47 between the plates 50, 51 and the flange underside 36 likewise is designed such that in the case of a fracture of the screw bolt connection 15a to be pretensioned or of the connection of the bolting tool 16 with the screw bolt connection 15a to be pretensioned during the pretensioning operation, the lift-off path of the bolting tool 16 including the lift-off path of the lifting and transporting device 1 does not exceed a specified amount.

In addition, due to the form fit of the plates 50, 51 with the flange underside 36 and with the component wall 30 in cooperation with the auxiliary support bearings 8, which on the flange upper side 13 engage behind the screw bolt connections 15 adjacent to the screw bolt connection 15a to be pretensioned, a tipping moment likewise can be absorbed, so that tipping of the lifting and transporting device 1 over the flange edge 26 is prevented.

In the example as shown in FIGS. 12 to 16 the tensile anchor 40 includes a flexurally limp tensile element 52 which extends transversely across the upper transverse strut 19 of the lifting and transporting device 1 from its side facing the flange front side 17 to its side facing away from the flange front side 17 and at its two ends each includes a screw connector 53, which can be screwed onto the threaded end of a screw bolt connection 15 protruding from a screw nut 27 on the flange upper side 13.

In the inserted state of the lifting and transporting device 1, these screw connectors 53 on both sides of the frame 2 are screwed onto the threaded ends of the screw bolt connections 15 directly adjacent there.

In another (non-illustrated) exemplary example, the tensile anchor 40 is formed of two separate tensile elements which each are attached to one of the frame parts 11, 12 and include a screw connector 53, which-like in the exemplary example of FIGS. 12 to 16—can be screwed onto the threaded end of a screw bolt connection 15 protruding from a screw nut 27 on the flange upper side 13.

It is conceivable that each screw connector 53 is provided with a quick release or clamping mechanism, by means of which the connection with the threaded end protruding from a screw nut 27 can quickly be produced and be released again.

In FIGS. 5, 11 and 16, the lifting and transporting devices 1 of FIGS. 1 to 4, 6 to 10, and 12 to 15 are shown in use during the production of a screwed flange connection. A bolt tensioning cylinder 16 sits on the upper side 13 of the flange 25 and on the screw nut 27 of the screw bolt connection 15a to be pretensioned and is in force engagement with the end region of the screw bolt. The two frame parts 11, 12 are arranged on both sides of the bolt tensioning cylinder 16 in the transport direction 10. The first, second and third support roller pair 5, 6, 7 rests against the upper side 13 of the flange 25, against the component wall 30 and against the flange front side 17. The two auxiliary support bearings 8 engage behind the screw bolt connections 15 adjacent to the screw bolt connection 15a to be pretensioned. The holding means 3 is attached to the bolt tensioning cylinder 16.

The screw bolt now is pretensioned. After termination of the tensioning operation, the bolt tensioning cylinder 16 is released from the bolt end, the holding means 3 and the bolt tensioning cylinder 16 attached to the same is moved upwards by means of the gas pressure springs 21 to such an extent that the lower edge of the bolt tensioning cylinder 16 lies above the screw bolt end of the screw bolt connection 15a now pretensioned. The lifting and transporting device 1 and with it the bolt tensioning cylinder 16 now can freely be shifted or rolled to the next screw bolt connection 15 and there the bolt tensioning cylinder 16 can be set onto the screw bolt connection 15 by again retracting the gas pressure cylinders 21.

The above-cited patents and patent publications are hereby incorporated by reference in their entirety. While the present method and/or system has been described with reference to certain implementations, it will be understood by those skilled in the art that various changes may be made, and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the implementations disclosed. Instead, the present method and/or system will include all implementations falling within the scope of the appended claims, both literally and under the doctrine of equivalents.

What is claimed is:

1. A lifting and transporting device for lifting a load and transporting the load transversely to a lifting direction, for use in manufacturing a screwed flange connection in order to bring a bolting tool into a bolting position in which it is in engagement with a screw bolt connection to be pretensioned or to be released, or into a transport position in which it is out of engagement with a screw bolt connection and can be transported to a next screw bolt connection, wherein a flange extends horizontally, the lifting and transporting device comprising:
    a frame configured to pick up and lift a load, wherein the frame extends around a load space of specified size; and
    a holder configured to hold the load, wherein the holder is movable relative to the frame in the lifting direction,
        wherein the holder comprises a hoist that is attached to the frame beside or adjacent the load space and is configured to lift and lower the holder with a load attached thereto,
        wherein the frame is mounted on a first support bearing and a second support bearing, whose support directions each extend perpendicularly to a transport direction and at a specified angle to each other, and which both in the lifting direction and perpendicularly to the transport direction and to the lifting direction have a distance to each other,
        wherein the first support bearing is designed for abutment against an upper side of the flange between a screw bolt connection and a flange edge and the second support bearing is designed for abutment above the screw bolt connection against a component wall extending from the flange, and
        wherein a tensile anchor is operatively connected with the bolting tool and in a state of the lifting and transporting device mounted on a flange can releasably be connected with the flange or with at least one screw bolt connection adjacent to the screw bolt connection to be pretensioned and is designed to limit a lift-off path of the bolting tool in a hoisting direction to a specified amount in a case of a fracture of the screw bolt connection to be pretensioned or of the connection of the bolting tool with the screw bolt connection to be pretensioned during the pretension of this screw bolt connection.

2. The lifting and transporting device according to claim 1, wherein the tensile anchor includes an L-shaped web, which
    is designed to extend along a flange front side with a first portion and along a flange underside with a second portion extending transversely to the first portion, wherein at least on a partial section the second portion does not exceed a specified clear maximum distance to the flange underside, is of flexurally rigid design and is flexurally rigidly connected with the frame, and is designed to limit the lift-off path of the frame in the hoisting direction to a second specified amount by form fit between the flange underside and at least said partial section of the second portion of the L-shaped web.

3. The lifting and transporting device according to claim 2, wherein the L-shaped web includes two L-shaped web parts which are spaced apart from each other in the transport direction and extend parallel to each other.

4. The lifting and transporting device according to claim 2, wherein the second portion of the L-shaped web is designed to end in front of the screw bolt connections.

5. The lifting and transporting device according to claim 3, wherein the second portions of the two L-shaped web parts each on at least one partial section are designed to engage behind the screw bolt connections, which are adjacent to the screw bolt connection to be pretensioned, and the partial sections engaging behind are said partial sections which do not exceed the specified clear maximum distance to the flange underside.

6. The lifting and transporting device according to claim 2, wherein the L-shaped web furthermore is designed to form a C-shaped flexurally rigid structure in cooperation with the first support bearing resting on the flange upper side, which C-shaped structure in the case of a fracture of the screw bolt connection to be pretensioned or of the connection of the bolting tool with the screw bolt connection to be pretensioned limits a tipping angle of the frame about an axis parallel to the transport direction to a respectively specified amount by form fit with the flange.

7. The lifting and transporting device according to claim 2, wherein the tensile anchor includes at least one tensile element which is attached to the frame and includes a screw connector which can be screwed onto a threaded end of a screw bolt connection protruding from a screw nut on the flange upper side.

8. The lifting and transporting device according to claim 7, wherein the frame includes a transverse strut which in a state of the lifting and transporting device mounted on a flange extends above the screw bolt connection to be pretensioned, and that the tensile element extends transversely across the transverse strut from its side facing the flange front side to its side facing away from the flange front side and on both sides of the frame can be screwed onto the threaded end of a screw bolt connection protruding from a screw nut.

9. The lifting and transporting device according to claim 7, wherein the tensile anchor is formed of two separate tensile elements each of which is attached to one of the frame parts and includes a screw connector which can be screwed onto the threaded end of a screw bolt connection protruding from a screw nut on the flange upper side.

10. The lifting and transporting device according to claim 7, wherein each screw connector is provided with a quick release or clamping mechanism, by means of which the connection with the threaded end protruding from a screw nut can quickly be produced and be released again.

11. The lifting and transporting device according to according to claim 1, wherein at least the second support bearing is magnetic.

* * * * *